(12) United States Patent
Bergstrom

(10) Patent No.: US 6,398,989 B1
(45) Date of Patent: Jun. 4, 2002

(54) DROP FORMING METHODS AND APPARATUS

(75) Inventor: Kristen A. Bergstrom, Ridgewood, NJ (US)

(73) Assignee: Sandvik Process Systems, Inc., Totowa, NJ (US)

( * ) Notice: Subject to any disclaimer, the term of this patent is extended or adjusted under 35 U.S.C. 154(b) by 0 days.

(21) Appl. No.: 09/498,345

(22) Filed: Feb. 4, 2000

Related U.S. Application Data

(63) Continuation-in-part of application No. 09/031,838, filed on Feb. 27, 1998, now abandoned.

(51) Int. Cl.$^7$ ................................................ B29B 9/10
(52) U.S. Cl. .......................... 264/8; 264/13; 264/299; 425/6; 425/8
(58) Field of Search ............................ 425/6, 8; 264/8, 264/299, 13

(56) References Cited

U.S. PATENT DOCUMENTS

| | | | |
|---|---|---|---|
| 4,279,579 A | | 7/1981 | Froeschke |
| 4,610,615 A | * | 9/1986 | Froeschke ........................ 425/8 |
| 4,623,307 A | * | 11/1986 | Froeschke ........................ 425/8 |
| 5,382,145 A | * | 1/1995 | Harreither ........................ 425/8 |
| 5,395,560 A | * | 3/1995 | Schwager ......................... 264/8 |
| 5,591,458 A | * | 1/1997 | Froeschke et al. .............. 425/6 |
| 5,766,642 A | * | 6/1998 | Froeschke ........................ 425/6 |

* cited by examiner

Primary Examiner—Mary Lynn Theisen
(74) Attorney, Agent, or Firm—Burns, Doane, Swecker & Mathis, LLP

(57) ABSTRACT

A drop former includes a rotary screen forming an internal chamber into which a flowable chemical is introduced, the chamber being kept at atmospheric pressure. The screen has a thickness in the range of 0.05 to 0.4 mm. As the screen moves, the flowable chemical is caused to impinge against a pressure member disposed within the chamber to create a hydrodynamic force which forces the chemical through openings of the screen, thereby forming drops which are transferred onto a transfer surface. The drops harden into particles on the transfer surface and are subsequently removed therefrom and collected. The screen may be formed of a photochemically etched, or laser-drilled, metallic sheet.

14 Claims, 2 Drawing Sheets

US 6,398,989 B1

DROP FORMING METHODS AND APPARATUS

RELATED INVENTION

This application is a Continuation-in-Part of U.S. Ser. No. 09/031,838, filed on Feb. 27, 1998, now abandoned, the content of which is incorporated herein by reference.

BACKGROUND OF THE INVENTION

The invention relates to drop forming methods and apparatus for forming liquid chemicals into small particles.

It is conventional to form liquid chemicals into small particles. Such a practice is performed, for example in the production of pharmaceuticals, flavors, fragrances, detergents, antioxidants, plastics stabilizers, surfactants, nutrients, and edible fats among other chemicals.

One common way of producing such particles is through the use of a so-called drop former, as disclosed for example, in Froeschke U.S. Pat. No. 4,279,579 which comprises a stationary inner cylinder, called a stator, and a rotary outer drum. The stator forms an inner chamber which contains a flowable chemical and is maintained under pressure greater than atmospheric pressure, e.g., 35–100 psi on average, depending upon the viscosity and desired flow rate, among other parameters. The stator has a row of holes disposed at a six o'clock position. The outer drum, which is mounted for rotation on the stator, has rows of holes extending around the entire periphery thereof. The holes must be formed by a drilling process using a mechanical drill, which adds considerably to the manufacturing costs, and necessitates that the particles be of circular cross section, even though other shapes might be preferred.

During rotation of the outer drum, the rows of holes thereof sequentially pass through the six o'clock position whereby they come into vertical alignment with the row of holes of the stator. When that occurs, the pressure within the inner chamber forces the flowable chemical through the aligned holes, and becomes deposited in the form of drops upon a transfer surface, e.g., a belt, cylinder or web. The drops harden into particles on the transfer surface and are eventually removed therefrom.

When such a device is employed to make particles of relatively large size, e.g., 3 to 12 mm in diameter, the uniformity of diameter from one particle to the next is relatively uniform.

However, when making smaller particles, the diameter uniformity drops off dramatically. That drop-off creates problems in connection with the manufacture of certain kinds of particles. For instance, in the manufacture of pharmaceuticals, uniform particle size is necessary to ensure proper dosing.

Also, in the manufacture of powder detergents, additives are mixed with the detergent. Uniformity in the size of the additive particles is desirable to prevent solids-separation in packaging.

Moreover, in the manufacture of some plastics, stabilizers must be added. The stabilizers can be provided in the form of particles which must be melted in order to be properly combined with the plastics. The melting is often performed in an extruder. If the stabilizer particles are too large, the extruder barrel must be increased to ensure that the particles are properly melted to achieve a homogeneous mixing with the plastics. If homogeneity is not achieved, a larger percentage of additive must be provided to ensure the presence of enough additive throughout the plastic.

Therefore, it would be desirable to achieve, in a relatively inexpensive manner, a uniformity of diameter when making small particles, especially particles in the range of about 0.01 to 3.5 mm diameter, or about 0.01 to 10 $mm^2$ in cross-sectional area. It would also be desirable to be able to produce particles in shapes other than round.

The present inventors believe they know why the uniformity of particle diameter drops off when making the smaller particles with a drop former, and have developed a drop forming method and apparatus for overcoming that problem.

SUMMARY OF THE INVENTION

The present invention relates to a drop forming apparatus for forming a flowable chemical into particles. The apparatus comprises a screen mounted for movement, the screen being of a thickness in the range of 0.05 to 0.4 mm and forming an internal chamber kept at substantially atmospheric pressure. The chamber is adapted to contain a flowable chemical. The screen has openings formed therethrough for discharging the flowable chemical from the chamber, each opening having a cross-sectional area in the range of 0.01 to 1.1 $mm^2$. A drive member is operably connected to the screen for moving the screen. A pressure member is disposed within the chamber adjacent a lower portion of an inner surface of the screen for creating a hydrodynamic pressure as the screen rotates, for pressing the flowable chemical through the openings to form the flowable chemical into drops. A transfer surface is disposed beneath the screen onto which the drops are transferred and harden into particles. A collector is provided for collecting the particles from the transfer surface.

Preferably, the screen comprises a cylinder which is rotatable about a horizontal axis.

The invention also pertains to a method of forming a flowable chemical into particles. The method comprises the steps of providing a screen which forms an internal chamber, the screen being of a thickness in the range of 0.05 to 0.4 mm and having openings formed therethrough, each opening having a cross-sectional area in the range of 0.01 to 1.1 $mm^2$. A flowable chemical is contained within the chamber under substantially atmospheric pressure. The screen is moved while the flowable chemical is hydrodynamically pressured by a pressure member and caused to flow through the openings to form the flowable chemical into drops. The drops are deposited onto a transfer surface which is disposed beneath the screen, whereupon the drops harden into particles. The particles are then removed from the transfer surface.

BRIEF DESCRIPTION OF THE DRAWINGS

The objects and advantages of the invention will become apparent from the following detailed description of a preferred embodiment thereof in connection with the accompanying drawing in which like numerals designate like elements and in which.

DETAILED DESCRIPTION OF PREFERRED EMBODIMENTS OF THE INVENTION

Figure 1:
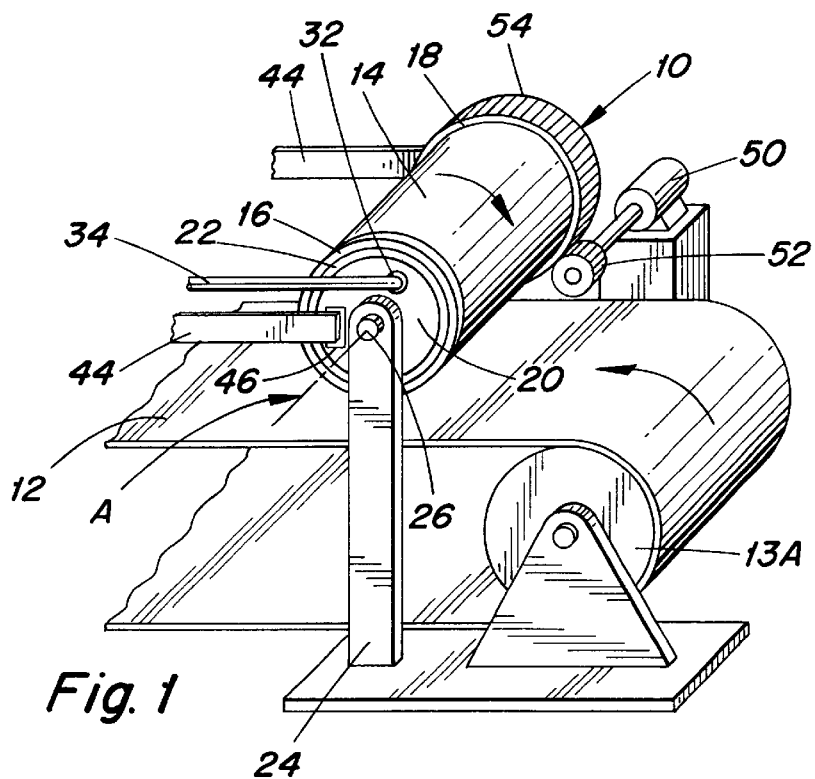
FIG. 1 is a top perspective view of a drop forming apparatus according to the present invention arranged above a transfer belt.

Depicted in FIG. 1 is a drop forming apparatus 10 for extruding a flowable chemical in the form of drops onto a transfer element such as a belt 12 which is driven around support rollers 13A, 13B. Alternatively, the transfer element could comprise a cylindrical drum. The extrusion apparatus 10 comprises a cylinder 14 in the form of an apertured screen, as will be described in greater detail hereinafter.

Opposite longitudinal ends of the screen 14 are fixed to respective end rings 16, 18. Each of the end rings 16, 18 is mounted on the outer periphery of a circular support plate 20 or 21 by means of a bearing 22 so that the end rings and the screen 14 can rotate together about a common center axis A of the screen. Each of the support plates 20, 21 is affixed to a respective vertical support arm 24 (only one support arm 24 depicted), by a mounting pin 26.

Figure 2:
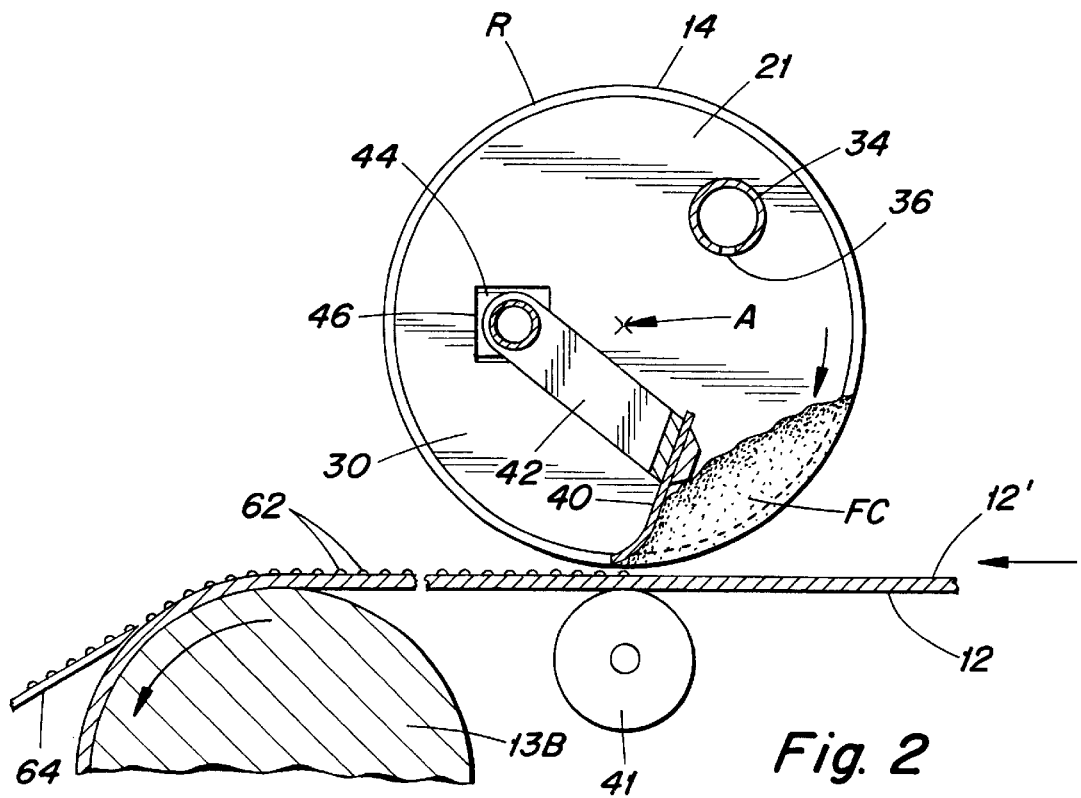
FIG. 2 is a vertical sectional view taken through the arrangement depicted in FIG. 1 as drops of a flowable chemical are deposited onto the transfer belt.

The screen 14 forms an internal chamber 30 (FIG. 2). At least one of the support plates 20 includes an opening 32 through which a supply pipe 34 extends in order to introduce a flowable chemical FC into the internal chamber 30. A portion of the supply pipe extends within the internal chamber 30 parallel to the axis A and includes one or more outlet slots along its lower side for supplying the internal chamber with the flowable chemical FC which accumulates at the bottom of the chamber 30.

Figure 4:
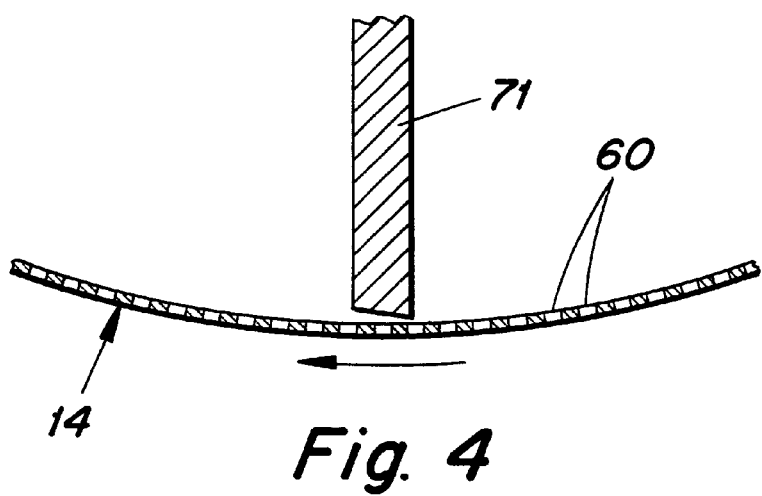
FIG. 4 is a view similar to FIG. 3 depicting an alternative form of pressing member.

Disposed within the chamber 30 is a pressure member, such as an elastic squeegee 40 (or a rigid steel bar 71, see FIG. 4)which presses against a lower portion of an inside surface of the screen 14. The squeegee 40 extends within the chamber 30 parallel to the longitudinal axis A and is affixed to longitudinally spaced arms 42 (only one arm 42 depicted). The arms 42 are affixed to respective carrier members 44 which project into the chamber 30 through respective holes 46 formed in the support plates 20, 21. The squeegee 40 is situated above a support roller 41.

Rotation of the screen 14 about the axis A can be achieved in any suitable manner, such as by a drive motor 50 which drives a pinion gear 52 that meshes with a ring gear 54 disposed on the end ring 18.

Figure 3:
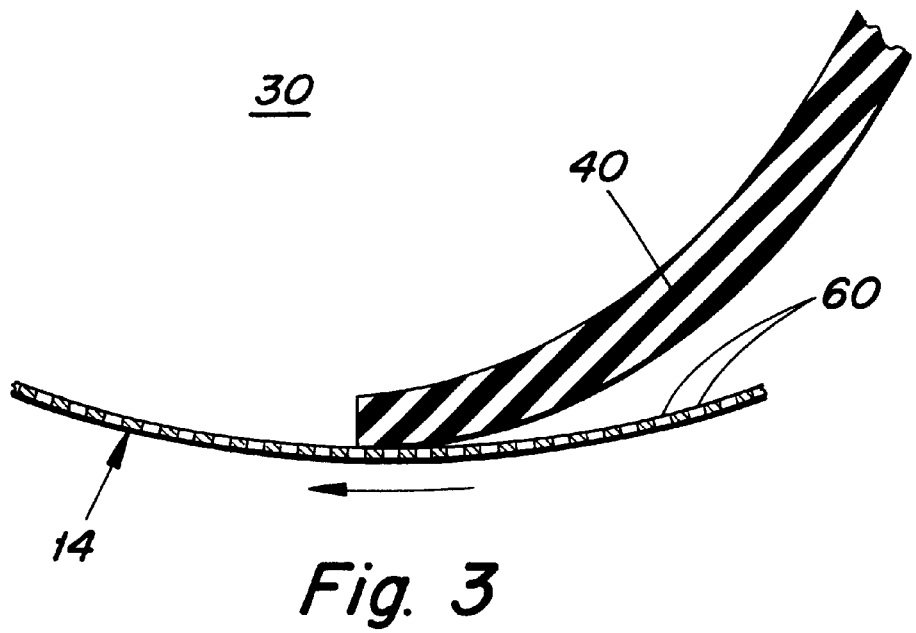
FIG. 3 is an enlarged fragmentary view of a pressing member in the form of a squeegee bearing against a cylindrical screen according to the present invention.

Importantly, the internal pressure of the chamber 30 is substantially atmospheric, and the screen has very shallow (short) openings 60 formed therein (see FIG. 3).

The atmospheric pressure is achieved by the provision of the holes 32, 46 in the end plates 20, 21 which communicate the chamber 30 with ambient atmospheric pressure. The shallow openings are achieved by the use of a thin screen 14 which is formed of a very thin steel sheet having a thickness in the range of 0.1 to 1.2 mm. The screen has openings 60 formed therein, e.g., by a conventional photochemical etching process, whereby the openings have a very uniform cross sectional area from one opening to the next. The openings have a cross sectional area in the range of about 0.01 to 10 $mm^2$. If the openings are circular, they have a diameter in the range of about 0.01 to 3.5 mm.

A particularly advantageous screen 14 has a thickness in the range of 0.05 to 0.4 mm, most preferably 0.1 to 0.3 mm so as to be highly flexible. The screen is so flexible that its ability to hold a cylindrical shape is due to the presence of a stiff circular ring R disposed inside of the screen at each end of the screen as is known in screen printing technology. The openings 60 of that screen each preferably has a cross sectional area in the range of 0.01 to 1.1 $mm^2$, most preferably about 0.07 $mm^2$. If the openings are circular, their diameter will be in the range of 0.06 to 1.2 mm, most preferably about 0.15 mm.

As a result of the above combination of: substantially atmospheric pressure, short openings, and a pressure member, the flowable chemical is subjected to a very uniform pressure drop as it is being discharged from the screen, the pressure being produced almost exclusively by the pressure member. The pressure drop is regulated by the size of the screen openings which can be mass produced with high precision. (A relatively insignificant amount of pressure will be produced by the weight of the accumulated mass of flowable material in the chamber 30.) This is in contrast to a conventional drop former wherein the interior of an inner drum is kept under pressure significantly greater than atmospheric e.g., 35–100 psi, as noted earlier, and the flowable substance is required to travel through relatively long passages, e.g., 2.0 mm, formed by aligned holes. It is believed by the inventors that in such a conventional drop former, the flowable chemical undergoes numerous pressure drops during its discharge, and that those pressure drops are a major reason why there exists relatively poor diameter uniformity from particle to particle during the manufacture of smaller particles.

In contrast, the present invention employs a thin screen which forms a chamber kept at atmospheric pressure, the flowable chemical being forced through the screen by hydrodynamic pressure created by the pressure member.

It should be understood that the combination of: a thin rotary screen forming an atmospheric-pressure chamber containing flowable printing ink, and a pressure member for creating a hydrodynamic pressure forcing the chemical through short openings of the screen is old in the printing art wherein the chemical ink is deposited onto a transfer media and adheres permanently thereto. The present inventors have discovered that such printing technology is applicable to the drop former art to enable high-precision particles to be formed by equipment which is substantially less expensive than conventional dropformers.

In operation of the invention, flowable chemical FC is supplied to the interior chamber 30 of the screen 14 through the pipe 34. The flowable chemical accumulates at the upstream side of the squeegee 40 (i.e., upstream with reference to travel of the screen 14 and the conveyor 12). The chamber 30 is kept at atmospheric pressure.

The viscosity of the flowable chemical is sufficiently high to keep the chemical from gravitating through the screen openings. However, as the screen is rotated, the flowable chemical travels therewith and is caused to impinge against the squeegee 40 which creates a hydrodynamic pressure to push the chemical through the openings 60. The flowable chemical undergoes little pressure drop during discharge and is transferred onto a transfer surface 12' (formed by the conveyor belt 12) in the form of drops 62 which quickly solidify into particles. Eventually the particles are collected from the surface 12', e.g., by being scraped off the belt by a scraper blade 64 as the belt travels around the roller 13B.

Typically, there would be provided a heated hood (not shown) extending around the screen exterior in close proximity thereto, to prevent residual chemical in the screen openings from solidifying and clogging the screen.

As a result of the present invention, relatively inexpensive equipment (as compared to conventional dropformers) can be employed to form small particles which have a highly uniform cross section from one particle to the next.

The invention is useful in forming particles of many types of chemicals, including, but not limited to, pharmaceuticals, flavors, fragrances, detergents, antioxidants, plastics stabilizers, surfactants, nutrients, and edible materials such as edible fats.

While the transfer surface 12' has been described above as being formed by a belt, it could instead comprise a cylindrical drum, or a web of kraft paper which is unwound from one roll while being wound-up on another roll.

If a belt is used to form the transfer surface, it could be formed of metal, Mylar, paper, Teflon-coated fabric, silicone or various composites and combinations of those or similar materials. The belt can travel over cooling rolls to promote solidification of the drops.

If a drum is used to form the transfer surface, the drum can be coated with various materials to give it the proper adhesion and release characteristics. In particular, it can be coated or have a very thin insulating layer attached to the surface. In some instances, this insulating layer can be coated or covered with another layer to impart desirable surface characteristics. The thin insulating layer, when used, would generally be flash heated just prior to the melt transfer point. Thus, the insulating layer would be hot for the short duration required to cause the melt to preferentially transfer from the screen to the drum. The thermal mass of the drum would then cool the thin insulating layer fast enough to solidify the particles so that they can be discharged to packaging. The provision of such flash heating results in an alternate solution to using a belt for products which require a warm surface either above the freezing point of the melt or too close to the freeze point of the melt to allow for efficient, rapid solidification and transferring of the particles from the drum to the packaging. Various heat sources including but not limited to hot air, infrared, microwave, or inductive and conductive types are envisioned to quickly heat the outer layers of the drum.

Instead of employing a scraper blade to remove the particles from the transfer surface, the transfer surface could be conveyed around a sharp bend to dislodge the particles.

Although the openings in the screen 14 have been described above as formed by a photochemical etching process, they could, instead, be laser drilled. Instead of employing a cylindrically-shaped screen, the screen could be in the form of an endless belt traveling in an elliptical (oval) path around spaced rollers, whereby a lower horizontal flight of the belt would be disposed above, and parallel to, the transfer surface. The flowable chemical would be seated upon a lower flight of the belt and pressed through the belt openings by a pressure member.

The pressure member has been disclosed in the form of a flexible squeegee. Alternatively, the pressure member could comprise a rigid steel bar 71 (FIG. 4) having a lower end spaced above, but in close proximity to, the inner surface of the screen for creating a hydrodynamic pressure to force the chemical through the screen. Alternatively, a roller could be used as a pressure member.

The disclosed dropformer can replace flaking and grinding or prilling. This is useful when prilling or grinding is difficult due to material characteristics such as high viscosity, softness, or toxicity. Also, this dropformer tends to produce a superior form as opposed to prilling or grinding. It does not contain the dust associated with grinding, and should produce better uniformity than prilling.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A drop forming apparatus for forming a flowable chemical into particles, comprising:

a screen mounted for movement, the screen forming an internal chamber kept at substantially atmospheric pressure and adapted to contain a flowable chemical, the screen being of a thickness in the range of 0.05 to 0.4 mm and having openings formed therethrough for discharging the flowable chemical from the chamber, each of the openings having a cross-sectional area in the range of 0.01 to 1.1 $mm^2$;

a drive member operably connected to the screen for moving the screen;

a pressure member disposed within the chamber adjacent a lower portion of an inner surface of the screen for creating a hydrodynamic pressure as the screen moves relative to the pressure member, for pressing the flowable chemical through the openings to form the flowable chemical into drops;

a transfer surface disposed beneath the screen for receiving the drops which harden into particles thereon; and a collector for removing and collecting the particles from the transfer surface.

2. The drop former according to claim 1, wherein the screen thickness is in the range of 0.1 to 0.3 mm.

3. The drop former according to claim 2, wherein the openings are circular, each opening having a diameter in the range of 0.06 to 1.2 mm.

4. The drop former according to claim 1, wherein the openings are circular, each opening having a diameter in the range of 0.06 to 1.2 mm.

5. The apparatus according to claim 1 wherein the screen comprises a cylinder rotatable about a horizontal axis, and provided with a stiff ring inside of the cylinder at each end thereof.

6. The apparatus according to claim 2 wherein the screen has photochemically etched openings.

7. The apparatus according to claim 1 wherein the screen has photochemically etched openings.

8. The apparatus according to claim 1 wherein the pressure member comprises an elastic squeegee.

9. The apparatus according to claim 1 wherein the pressure member comprises a rigid bar.

10. The apparatus according to claim 1 wherein the transfer surface comprises a surface of a conveyor belt.

11. A method of forming a flowable chemical into particles, comprising the steps of:

A) providing a screen which forms an internal chamber, the screen being of a thickness in the range of 0.05 to 0.4 mm and having openings formed therethrough, each opening having a cross-sectional area in the range of 0.01 to 1.1 $mm^2$;

B) containing flowable chemical within the chamber under substantially atmospheric pressure;

C) moving the screen to impinge the flowable chemical against a pressure member for creating a hydrodynamic pressure forcing the flowable chemical through the openings to form the flowable chemical into drops;

D) depositing the drops onto a transfer surface disposed beneath the screen, whereupon the drops harden into particles; and E) removing and collecting the particles from the transfer surface.

12. The method according to claim 11 wherein step A comprises rotating a cylindrical screen about a horizontal axis.

13. The method according to claim 11 wherein step C further includes impinging the flowable chemical against a pressure member in the form of an elastic squeegee.

14. The method according to claim 11 wherein step C further includes impinging the flowable chemical against a pressure member in the form of a rigid bar spaced immediately above an inner surface of the screen.

* * * * *